Jan. 20, 1953     F. M. FRIEDLOB     2,625,924
COMBINED COMPRESSION RELIEF AND CARBURETOR
CONTROL FOR INTERNAL-COMBUSTION ENGINES
Filed June 3, 1949     3 Sheets-Sheet 1
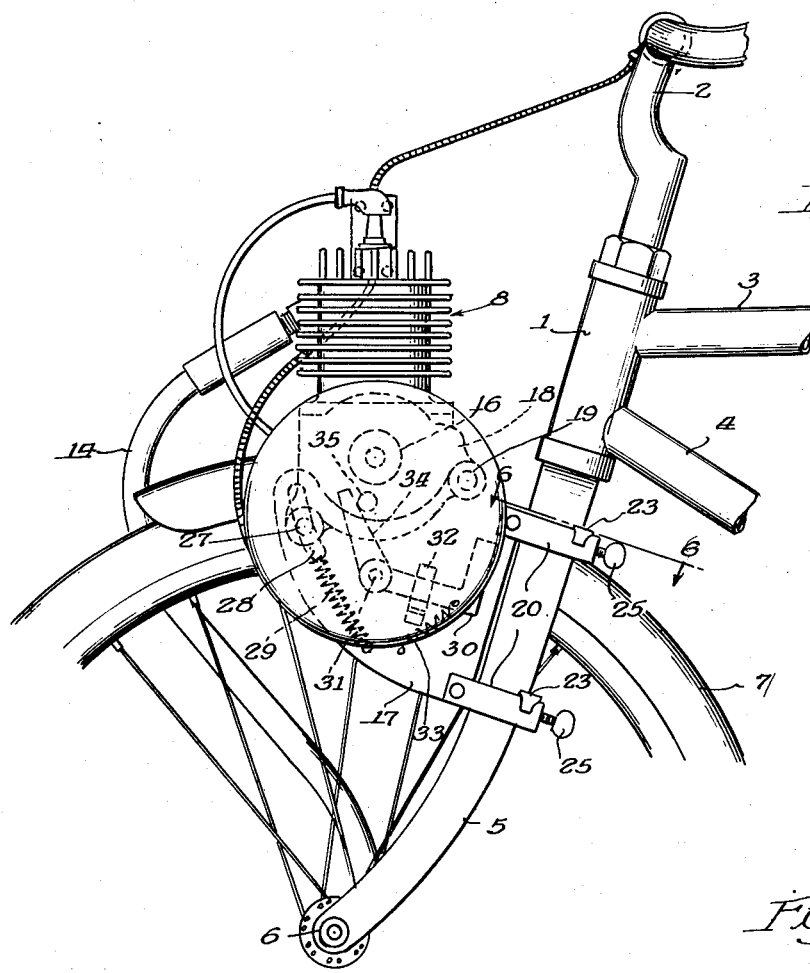
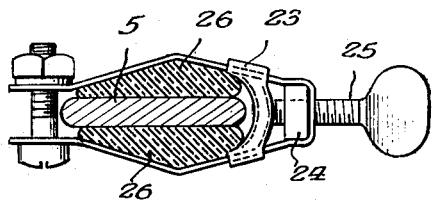
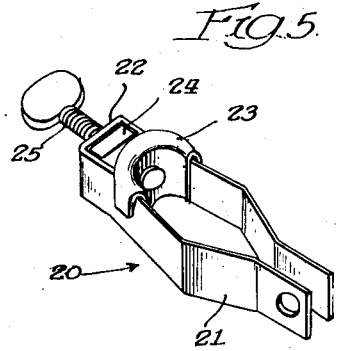
Inventor
Fred M. Friedlob
By: Spencer, Marzall, Johnston & Cook
Attys

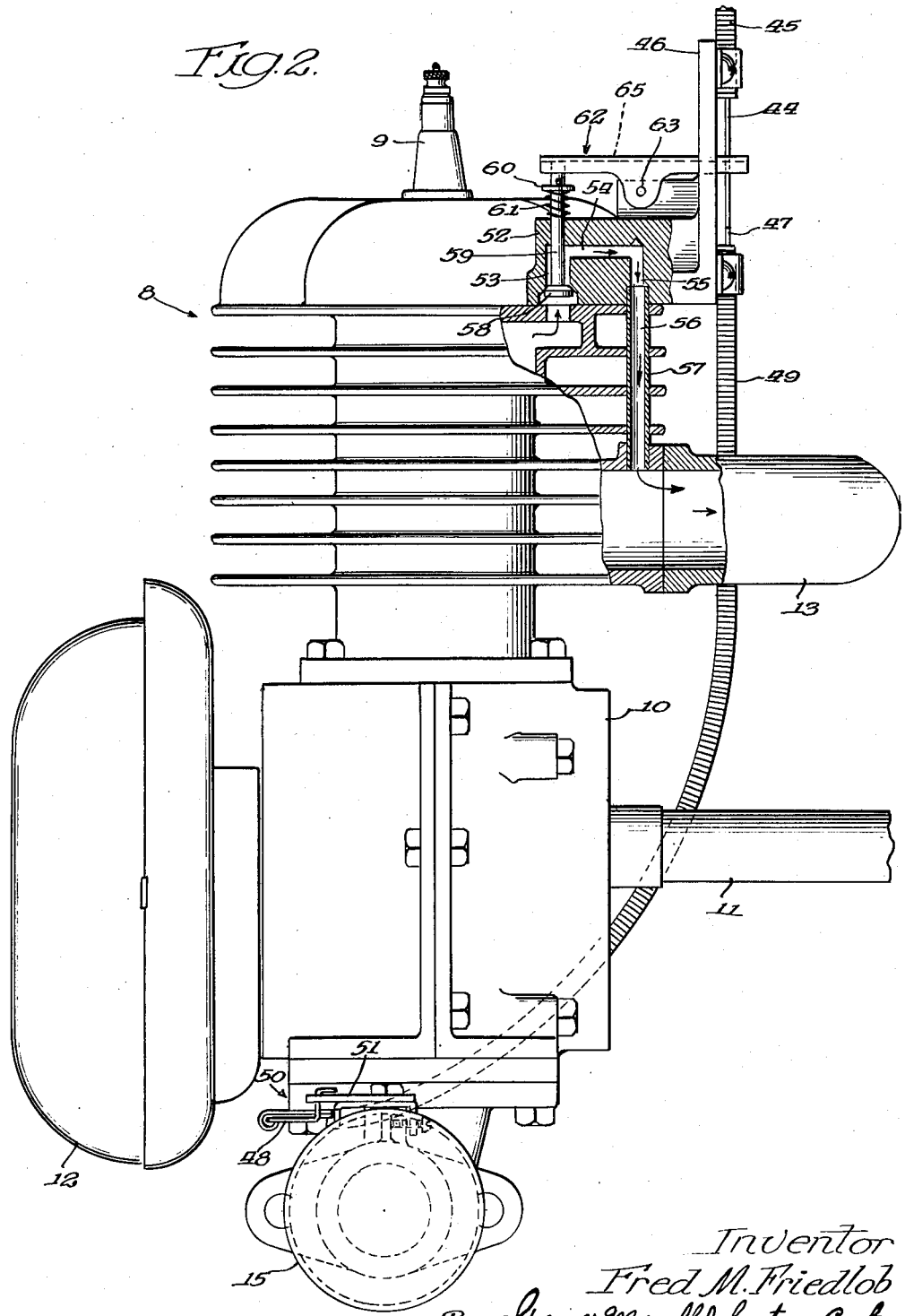

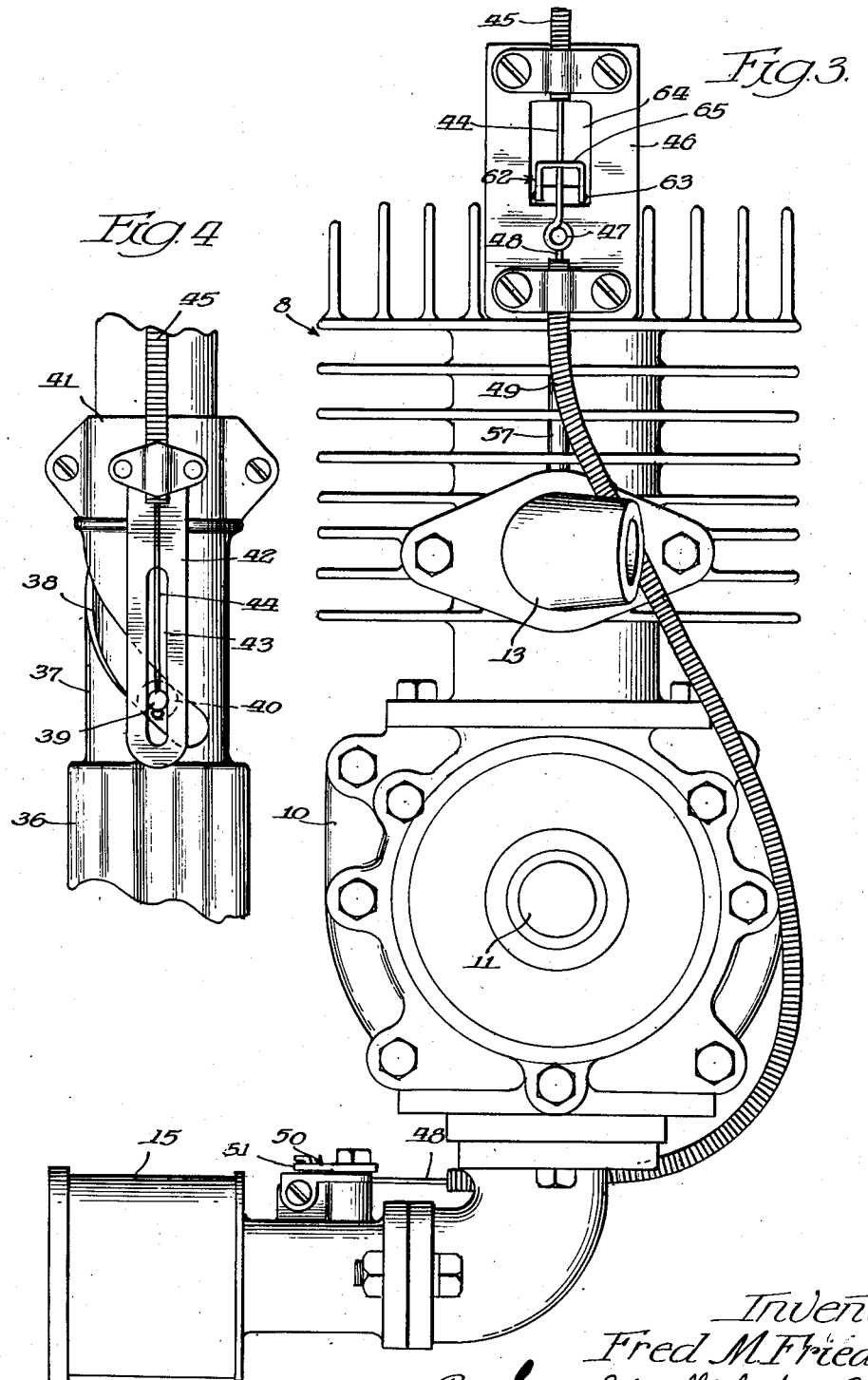

Patented Jan. 20, 1953

2,625,924

UNITED STATES PATENT OFFICE 2,625,924

COMBINED COMPRESSION RELIEF AND CARBURETOR CONTROL FOR INTERNAL-COMBUSTION ENGINES

Fred M. Friedlob, Chicago, Ill.

Application June 3, 1949, Serial No. 96,985

6 Claims. (Cl. 123—182)

This invention relates in general to improvements in internal combustion engines, and particularly to a small single cylinder engine adapted to be mounted on a bicycle, as well as to a new and novel means for mounting the engine on the frame of the bicycle. While the invention has been illustrated herein as a single cycle, it will be evident that a multicylinder engine can be used as well.

Heretofore in order to provide power means for driving a bicycle it has been necessary either to purchase a bicycle with power means built as a part thereof, or to purchase an engine separately which requires such a complicated installation procedure that a factory trained man is needed, and requires hours to install, which is additional expense to the purchaser unnecessary with the present invention. The mounting means for the engine disclosed herein and claimed in my copending application Serial No. 107,731, filed July 30, 1949, is simple and enables the average bicycle owner to install it himself in a few minutes.

Furthermore, present known engines of this type are complicated from the mechanical standpoint in that clutch means are usually provided so that the driving contact of the engine may be connected and disconnected from the bicycle through such clutch means. The present invention also overcomes such difficulties as this by eliminating the clutch and mounting the engine in such a way that it may be easily and quickly moved into and out of driving contact with a wheel of the bicycle.

It is, therefore, the principal object of the present invention to provide a small lightweight internal combustion engine which may be easily and quickly mounted on the frame of a bicycle.

A further object of the invention is to provide a novel form of throttle control for an internal combustion engine on a bicycle which may be operated by means of a control grip on the handle bars of the bicycle.

Still another object of the invention is to provide a compression release for permitting the bicycle engine to be easily started and smoothly stopped.

A still further and more specific object of the invention is to provide a compression release valve operable by actuation of the throttle control means on the handle bars of the bicycle to facilitate the starting and stopping of the bicycle engine.

Other objects and advantages of the invention will become apparent upon reading the following description taken in conjunction with the accompanying drawings in which:

Fig. 1 is a side elevational view of an internal combustion engine mounted on the frame of a bicycle and embodying the invention herein;

Fig. 2 is an enlarged fragmentary rear elevational view of the engine with certain parts broken away to show details;

Fig. 3 is a view of the engine looking toward the left of Fig. 2;

Fig. 4 is a fragmentary enlarged plan view of the control grip and control means for the throttle;

Fig. 5 is a perspective view of one of the mounting clamps; and

Fig. 6 is a transverse sectional view of the mounting clamp and a portion of the bicycle frame taken along line 6—6 of Fig. 1.

The engine of the present invention is a single cylinder internal combustion engine adapted to be mounted on the front fork of a bicycle frame. The crank shaft of the engine has a circular driving stone mounted thereon adapted to be moved into contact with the tire on the front wheel, whereby the frictional engagement of this stone with the wheel will drive the wheel when the engine is running. This stone is also used to start the engine by frictional contact with the front wheel of the bicycle while the bicycle is in motion. The entire engine with the driving stone attached thereto is mounted on the frame of the bicycle in such a manner that it may be elevated to disengage the stone and the front wheel or may be lowered for engagement therewith. Thus, when the engine is elevated and the stone and wheel are disengaged, the bicycle may be operated in the usual manner by pedaling.

Referring now more particularly to the drawings, and especially to Fig. 1, a portion of a typical bicycle frame has been shown which includes a front supporting member 1 having handle bars 2 mounted at the upper end thereof. Cross bars 3 and 4 extend rearwardly from this front supporting member 1 and the fork 5 extends downwardly therefrom to rotatably support at its lower end 6 the front wheel 7.

The engine itself comprises a cylinder 8 having a spark plug 9 at the top thereof. The usual piston and piston rod (not shown) are mounted for reciprocation within the cylinder and the piston rod extends downwardly into a crank case 10 within which the crank shaft 11 is located. The lower end of the piston rod may be connected in the usual manner to a crank portion on the crank shaft 11 so that rotation of the crank shaft will cause an upward movement of the piston for the compression stroke, after which ignition of the fuel will again force the piston down as is customary in all internal combustion engines.

The timer mechanism is housed within a timer housing 12 at one side of the crank case 10. The cylinder is provided with an exhaust pipe 13 and an extension 14 may be connected thereto to carry the exhaust gases downwardly and rearwardly. A carburetor 15 is located below the crank case 10 and may be connected in any suitable manner to a gasoline tank (not shown) on the opposite side of the engine. The driving stone which is mounted on the crank shaft 11 is indicated in Fig. 1 by the numeral 16 and is shown as being in frictional engagement with the tire on the wheel 7.

The mounting means by which the engine may be easily and quickly mounted on the frame of the bicycle includes a pair of spaced mounting plates 17 between which plates a supporting casting 18 for the engine is pivotally mounted at 19. The rear edges of each of the supporting plates 17 have a pair of mounting brackets 20 secured thereto.

Referring for the moment to Figs. 5 and 6, it will be seen that each mounting bracket 20 includes a pair of spaced arms 21 having a connecting web 22 at the outer end thereof. A movable tightening member 23 engages each of the side arms 21 and is mounted for sliding movement along the length of these arms. An internally threaded nut member 24 is positioned at one end of the bracket adjacent the connecting web 22, and has a thumb screw 25 extending therethrough and secured to the member 23.

It will be noted that the arms 21 diverge outwardly for a short distance and then converge so that when the thumb screw 25 is rotated to move the member 23 forwardly, there will be a tendency of this member to bring the two arms 21 together for clamping action.

When the engine is to be mounted on the frame of a bicycle it is merely necessary to remove the front wheel 7 from the fork 5, turn the bicycle upside down, and then apply the engine to the bicycle by sliding the brackets 20 over the fork 5. The two brackets 20 on one of the plates 17 will receive one arm of the fork 5 and the corresponding two brackets on the other plate 17 will receive the other arm of the fork 5. The engine is lowered along the fork the proper distance and thereafter the thumb screws 25 will be turned to move the member 23 forwardly thereby clamping the brackets against the arms of the fork 5 and securely mounting the engine in place. That is all that is required in mounting the engine on the bicycle.

In some instances each arm of the front fork 5 will be oval-shaped in cross section. In such cases the brackets 20 may be mounted directly thereon and tightened in place. In other instances, however, each arm of the fork 5 may be more rectangular in cross section, such as shown in Fig. 6. In this case the brackets 20 are not adapted to be applied and tightened directly to the fork. In anticipation of this contingency and for the purpose of enabling the engine to be mounted on any type of bicycle, there is provided a plurality of blocks or shims 26 each having one flat side and a convex side. When a thin rectangular arm such as the arm 5 shown in Fig. 6 is encountered, a shim 26 may be applied on each side of the arm around which the arms 21 of the bracket will fit. The thumb screw 25 may then be tightened in the usual manner to force the member 23 forwardly and urge the sides of the bracket together for clamping action.

After the engine is thus mounted on the frame of the bicycle, the front wheel 7 may be again mounted on the fork 5 and the bicycle turned upright for use.

The supporting casting 18 on which the engine is mounted has a pin 27 on each side thereof passing through an arcuate slot 28 in each of the mounting plates 17. Each pin 27 is adapted to traverse its respective slot 28 when the engine is elevated or lowered about the pivot point 19. A coiled tension spring 29 is located on each plate 17 and has the other end thereof secured to the mounting casting 18 to normally urge the engine downwardly and the driving stone 16 into frictional engagement with the wheel 7.

One of the mounting plates 17 has a release lever 30 of substantially U-shape pivotally mounted thereon by means of a pivot pin 31. A part of the lever 30 passes through a bracket 32 on the plate 17 for the purpose of limiting the pivotal movement of the lever. A coiled tension spring 33 normally urges one arm 34 of the lever against a pin 35 on the supporting casting 18.

The engine is shown in Fig. 1 in its lowered position where the pin 35 and arm 34 are disengaged and the driving stone 16 is in engagement with the wheel 7. When it is desired to disengage the driving stone and wheel, the casting 18 and the engine mounted thereon may be moved upwardly about the pivot pin 19 causing the pins 27 to traverse the slots 28. This upward movement will move the pin 35 upwardly, and since the arm 34 is being urged constantly against the pin 35, the arm 34 will snap into position below the pin 35 after the pin has cleared the end of the arm 34. The arm 34 will thus hold and maintain the engine in an elevated position, thus also maintaining the driving stone 16 out of engagement with the front wheel.

When the engine is to start and the driving stone is in contact with the wheel, difficulty is encountered in gaining sufficient speed to start the engine if it is under full compression. Means have, therefore, been provided operable with the throttle control to release the compression of the engine until sufficient speed has been attained by pedaling, whereupon the compression release valve will be closed and the engine will start.

The throttle control means and compression release mechanism are more clearly shown in Figs. 2, 3 and 4. A special control grip 36 is applied to one of the handle bars for moving longitudinally a control cable. In the present case, the grip is mounted for rotative movement, but it will be clear that other specific forms may also be used. This grip has an extension 37 thereon provided with a spiral groove 38. A pin 39 having an enlarged base portion 40 is adapted to traverse the spiral slot 38 when the grip 36 is rotated. A bracket 41 mounted forwardly of the control grip on the handle bar has a rearwardly extending arm 42 with an elongated slot 43 therein intersecting the spiral groove 38 and receiving the pin 39. It will, therefore, be evident that rotation of the control grip 36 will cause a spiral movement of the slot 38 and will result in the pin 39 traversing the elongated slot 43.

The throttle is controlled by means of a cable 44 having one end attached to the pin 39. The cable 44 passes within the cable housing 45, the other end of which is mounted on a bracket 46 located at the upper end of the cylinder 8. The other end of the cable 44 terminates in an eye 47 and is secured to a cable 48 extending through a cable housing 49 secured at one end thereof to the opposite end of the bracket 46. The housing 49 extends downwardly adjacent the throttle control valve 50. This valve has an arm 51 connected thereto to which the opposite end of cable 48 is secured. It will also be clear that longitudinal movement of the cable 44 caused by rotation of the control grip 36 will cause a simultaneous longitudinal movement of the cable 48 and operation of the valve 50 through rotation of the arm 51. The valve 50 being connected to the carburetor 15 will therefore act to control the flow of gasoline, and the speed of the bicycle.

Referring now to Fig. 2, the cylinder 8 has a housing 52 mounted thereon which is provided with a vertical passageway 53, a horizontal passageway 54 and another vertical passageway 55 communicating with each other and also communicating with a passageway 56 in a tubular member 57. The lower end of member 57 connects with the exhaust pipe 13. The passageway 53 is normally closed by a valve 58 having a valve stem 59 passing upwardly through the housing 52. The valve stem 59 has a collar 60 thereon and a coiled compression spring 61 surrounds this stem and bears upwardly against the collar 60 for maintaining the valve in closed position. When this valve 58 is closed, the engine is then under compression. When the valve 58 is opened, the compression is released through the passageways 53, 54, 55 and 56 to the exhaust pipe 13.

The outer end of valve stem 59 is positioned so that one end of a rocker arm 62 pivotally mounted at 63 intermediate the ends thereof on a part of the housing 52 will come against said end of the valve stem to depress the valve. The other end of rocker arm 62 passes through an opening 64 in the bracket or plate 46. Rocker arm 62 is substantially U-shaped and has the two arms thereof connected by a web 65. The throttle control cable 44 passes through an opening provided in the web 65 at the outer end of rocker arm 62. A limited movement of the control cable 44 may be had from its position shown in Fig. 3 upwardly until the eye 47 strikes against the connecting web 65 of rocker arm 62. The throttle is substantially full open in the position of the cable 44 shown in Fig. 3. As the grip 36 is rotated to the left and toward its position shown in Fig. 4, the eye 47 will approach the web 65. During this period the throttle will be closed thereby decreasing the speed of the engine and bicycle. The engine will be idling by the time the eye 47 reaches the web 65. This will be the position of the control grip 36 and pin 39 as shown in Fig. 4.

It will be clear that further movement of the grip 36 toward the left to move the pin 39 farther toward the end of the slot 43 will cause the eye 47 of cable 44 to urge one end of rocker arm 62 upwardly about its pivot point 63. The left hand end of rocker arm 62 as viewed in Fig. 2 will thereupon be moved downwardly against the force of spring 61 to open the valve 58. If the engine is running when this occurs, this release of compression will stop the engine, and if the valve 58 is maintained in its open position, the rider of the bicycle may continue to pedal without exerting any force against the compression of the engine.

In normal operation of the bicycle with this engine attached thereto, the engine will be elevated so that the driving stone 16 is out of contact with the wheel 7. The bicycle may then be used in the usual and ordinary manner. Arm 34 may be released from under pin 35 by rotative movement of lever 30. A force exerted downwardly on the engine after release of the lever 30 will pivot the mounting means thereof around the pivot pin 19 and the spring 29 will act to maintain the stone 16 in contact with the wheel 7. When the stone and wheel are thus in driving engagement, the rider may then rotate the control grip 36 around toward the left a sufficient distance to open the release valve 58 as above explained, thereby releasing the compression in the engine. The rider may then operate the bicycle in the usual manner by pedaling until sufficient speed has been attained to start the engine, whereupon the control grip may be rotated toward the right to close the valve 58 and start the engine.

An advantage in this arrangement is that the control cable will set the throttle at its idling speed as soon as the compression release valve is closed. Increased speed may thereafter be obtained by a continued rotation of the control grip toward the right after the release valve is closed.

From the foregoing description it will be evident that the invention herein embodies a novel throttle control arrangement for use on internal combustion engines applied to bicycles as well as a novel mounting means for the engine which will enable the average unskilled person to apply and mount the engine on his own bicycle.

Changes may be made in the form, construction and arrangement of parts from that disclosed herein without in any way departing from the spirit of the invention or sacrificing any of the attendant advantage thereof, provided, however, that such changes fall within the scope of the claims appended hereto.

The invention is hereby claimed as follows:

1. In an internal combustion engine adapted for use on bicycles and having a carburetor thereon, throttle control mechanism including a control grip, means rotatably mounting said control grip on one of the handle bars of the bicycle, fuel flow control means on the carburetor, a longitudinally movable member connecting said control grip with said fuel flow control means for operating said last named means to cause acceleration and deceleration upon rotation of said grip, valve means for releasing the compression of the engine, and means operable during a predetermined range of rotation of said control grip and corresponding longitudinal movement of said member to actuate said valve means to release compression.

2. In an internal combustion engine adapted for use on bicycles and having a carburetor thereon, throttle control mechanism including a control grip, means rotatably mounting said control grip on one of the handle bars of the bicycle, a cable connecting said control grip with the carburetor and movable longitudinally upon rotation of said grip to control the throttle for acceleration and deceleration, valve means for releasing the compression of the engine, and means on said cable for actuating said valve means during rotation of said grip within a predetermined range of movement.

3. In an internal combustion engine adapted for use on bicycles and having a carburetor thereon, throttle control mechanism including a control grip, means rotatably mounting said control grip on one of the handle bars of the bicycle, a cable connecting said control grip with the carburetor and movable longitudinally upon rotation of said grip to control the throttle for acceleration and deceleration, a compression release device operable to release the compression of the engine, and means intermediate the ends of said cable for operating said compression release device upon longitudinal movement of said cable within a predetermined range.

4. In an internal combustion engine adapted for use on bicycles and having a carburetor thereon, throttle control mechanism including a control grip, means rotatably mounting said control grip on one of the handle bars of the bicycle, a cable connecting said control grip with the carburetor and movable longitudinally upon rotation of said grip to control the throttle for acceleration and deceleration, an elongated valve movable longitudinally from closed to open positions, said valve being normally closed but movable to open position to release the compression of the engine, and means on said cable operable to open said valve for compression release during a predetermined range of longitudinal movement of said cable.

5. In an internal combustion engine adapted for use on bicycles and having a carburetor thereon, throttle control mechanism including a control grip, means movably mounting said control grip on one of the handle bars of the bicycle, a cable connecting said control grip with the carburetor and movable longitudinally upon operation of said grip to control the throttle to acceleration from idling position, a compression release device mounted for movement to release the compression of the engine, and means on said cable for operating said compression release device when said cable is moved by operation of said grip from accelerated position past the idling position thereof.

6. In an internal combustion engine adapted for use on bicycles and having a carburetor thereon, throttle control mechanism including a control grip, means rotatably mounting said control grip on one of the handle bars of the bicycle, said grip being adapted for rotation in one direction successively from compression release position to idling position to accelerating position, a cable connecting said control grip with the carburetor and movable longitudinally upon rotation of said grip through a part of the rotative cycle to control the throttle between accelerating and idling positions, a compression release valve mounted for longitudinal movement to release the compression of the engine, and means on said cable for operating said compression release device when said cable is moved by rotation of said grip through another part of the rotative cycle from idling position to compression release position.

FRED M. FRIEDLOB.

REFERENCES CITED

The following references are of record in the file of this patent:

UNITED STATES PATENTS

| Number | Name | Date |
|---|---|---|
| 684,011 | Valentynowicz | Oct. 8, 1901 |
| 873,747 | Hedstrom | Dec. 17, 1907 |
| 1,177,209 | Pooley | Mar. 28, 1916 |
| 1,182,542 | Evans | May 9, 1916 |
| 1,393,838 | Seward et al. | Oct. 18, 1921 |
| 2,259,983 | Anderson | Oct. 21, 1941 |

FOREIGN PATENTS

| Number | Country | Date |
|---|---|---|
| 21,512 | Great Britain | 1914 |